United States Patent
Yang

(10) Patent No.: US 9,626,997 B1
(45) Date of Patent: Apr. 18, 2017

(54) VARIABLE SPINNING RATES FOR HARD DISK DRIVES

(71) Applicant: NetApp, Inc., Sunnyvale, CA (US)

(72) Inventor: Jinchao Yang, Wichita, KS (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 14/928,074

(22) Filed: Oct. 30, 2015

(51) Int. Cl.
*G11B 15/46* (2006.01)
*G11B 19/28* (2006.01)

(52) U.S. Cl.
CPC .................................. *G11B 19/28* (2013.01)

(58) Field of Classification Search
None
See application file for complete search history.

(56) References Cited

U.S. PATENT DOCUMENTS

| | | | | |
|---|---|---|---|---|
| 6,118,612 A * | 9/2000 | Judd | ...................... | G06F 3/0601 360/69 |
| 6,198,590 B1 * | 3/2001 | Codilian | ................ | G11B 19/20 360/73.03 |
| 6,534,936 B2 * | 3/2003 | Messenger | ............. | G11B 19/20 318/400.11 |
| 8,743,502 B1 * | 6/2014 | Bonke | .................. | G11B 19/046 318/268 |

* cited by examiner

*Primary Examiner* — K. Wong
(74) *Attorney, Agent, or Firm* — Haynes and Boone, LLP

(57) ABSTRACT

Systems and techniques for varying the spindle speed of a hard disk drive are disclosed. In some embodiments, the systems and techniques involve a hard disk drive (HDD) that is accessible to a storage controller. A spin speed of the HDD is set to a full spinning speed, and an amount of time that the HDD is unassigned is compared to a threshold. After detecting that the threshold is exceeded, the spin speed of the HDD is decreased to a reduced spinning speed. Likewise, upon determining that the HDD is assigned, the spin speed of the HDD is increased to the full spinning speed. In various such embodiments, assigning the HDD may include assigning the HDD to a volume group or assigning the HDD operate as an in-use hot spare.

20 Claims, 4 Drawing Sheets

VARIABLE SPINNING RATES FOR HARD DISK DRIVES

TECHNICAL FIELD

The present description relates to data storage and retrieval and, more specifically, to techniques and systems for varying a spinning speed corresponding to a hard disk drive.

BACKGROUND

Traditional data centers use redundant array of independent disks (RAID) storage technologies to store data to hard disk drive (HDD) storage media. These HDD storage media include spindles that rotate platters at high spinning speeds when the HDD storage media are integrated into the RAID storage system. The high spinning speeds are maintained throughout the operation of the HDDs for the HDDs to remain accessible for read and write I/O by the storage system and hosts.

Conventionally the HDDs may have spin speeds in excess of 7,000 rotations per minute (RPMs) or 15,000 RPMs, depending upon the technology used. Generally, higher spin speeds correspond to faster I/O performance due to shortened seek and access times. However, the power consumption of the HDDs also increases at higher spin speeds. For data centers that have a large number of HDDs (for example, millions of HDDs), power consumption may be a significant cost.

One HDD technology that is available to target the power consumption problem is HDD technology that provides a sleep mode. In sleep mode, the spindle motor of an HDD may be powered down to reduce power consumption. This technology has been used by technology centers to allow the data centers to provide two hard drive states: full speed and spun down (not spinning). However, while in the spun down state, I/O cannot be performed on the HDD. Thus, to access data from the HDD, the spin speed of the HDD must be increased from the not spinning state to the full speed, which may cause delays that adversely affect performance.

Therefore, a need exists for systems and techniques to make efficient use of the power savings and other improvements offered by reducing the spin speeds of HDDs, while maintaining the processing advantages of spinning the HDDs at full spin speeds. In particular, systems and methods that vary HDD spin rates without significantly impacting performance would provide a valuable improvement over conventional storage systems. Thus, while existing storage systems have been generally adequate, the techniques described herein achieve higher energy efficiency while maintaining performance.

BRIEF DESCRIPTION OF THE DRAWINGS

The present disclosure is best understood from the following detailed description when read with the accompanying figures.

DETAILED DESCRIPTION

Figure 1:
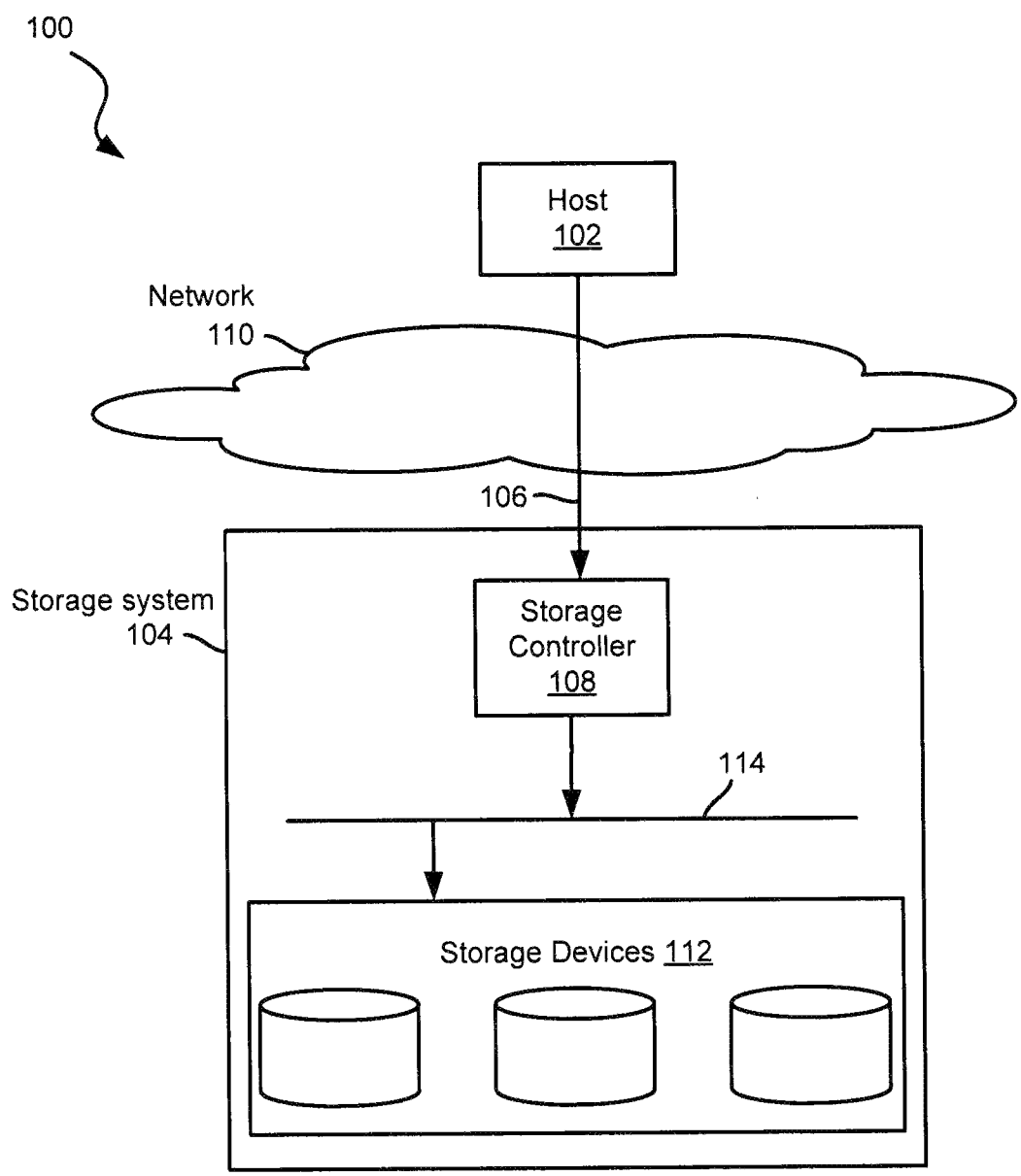
FIG. 1 is a schematic diagram of an exemplary storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments except where explicitly noted. Finally, in view of this disclosure, particular features described in relation to one aspect or embodiment may be applied to other disclosed aspects or embodiments of the disclosure, even though not specifically shown in the drawings or described in the text.

Various embodiments provide a system, method, and machine-readable medium for a storage system that varies the spin rates of HDDs to adapt to changing roles, assignments and/or workloads. Specifically, HDDs may be controlled to increase their spin speed and to decrease their spin speed based on identified conditions. These identified conditions allow an HDD to operate at lower, more efficient, spin speeds without impacting performance. These identified conditions include, for example, the HDDs having particular states, roles, and/or workload statistics. For example, HDDs that are not assigned to volume groups, that are in standby hot spare mode, and/or that receive I/O below a threshold may be spun at a reduced spinning rate without impacting performance. In another example, HDDs that are assigned to volume groups, operating as in-use hot spares, and/or receiving I/O above a threshold may be spun at an increased rate, up to and including a full spinning rate.

The embodiments disclosed herein may provide several advantages. First, power consumption is reduced when HDDs are spun at reduced speeds. Second, heat generation is reduced when HDDs are spun at reduced speeds. Third, cooling costs are reduced when HDDs are spun at reduced speeds. Fourth, HDD life is extended when HDDs are spun at reduced speeds. Finally, spinning HDDs at reduced speeds reduces the noise generated by the HDDs. In addition, by identifying conditions for spinning the HDDs at reduced speeds, the embodiments disclosed herein offer the above benefits without impacting performance. Of course, it is understood that these features and advantages are shared among the various examples herein and that no one feature or advantage is required for any particular embodiment.

FIG. 1 is a schematic diagram of an exemplary storage architecture 100 according to aspects of the present disclosure. The storage architecture 100 includes a host 102 in communication with a storage system 104. It is understood that for clarity and ease of explanation, only a single host 102 and a single storage system 104 are illustrated, although any number of hosts may be in communication with any number of storage systems. Furthermore, while the storage system 104 and the host 102 are referred to as singular entities, a storage system 104 and/or host 102 may include any number of computing devices and may range from a single computing system to a system cluster of any size. Accordingly, each host 102 and storage system 104 includes at least one computing system, which in turn includes a processor such as a microcontroller or a central processing unit (CPU) operable to perform various computing instructions. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a communication interface such as an Ethernet interface, a Wi-Fi (IEEE 802.11 or other suitable standard) interface, or any other suitable wired or wireless communication interface; and/or a user I/O interface coupled to one or more user I/O devices such as a keyboard, mouse, pointing device, or touchscreen.

With respect to the host 102, host 102 includes any computing resource that is operable to exchange data with a storage system 104 by providing (initiating) data transactions to the storage system 104. In an exemplary embodiment, a host 102 includes a host bus adapter (HBA) for communication with a storage controller 108 of the storage system 104. In other embodiments, host 102 may be connected to one or more storage controllers. The HBA of the host 102 may provide an interface for communicating with the storage controller 108. The interface may conform to any suitable hardware and/or software protocol. In various embodiments, examples of interfaces that may be used by a host 102 include Serial Attached SCSI (SAS), iSCSI, Infini-Band, Fibre Channel and/or Fibre Channel over Ethernet (FCoE) bus adapters. Examples of other protocols include SATA, eSATA, PATA, USB, Wi-Fi and Fire Wire.

A communication path between the host 102 and the storage controller 108 is referred to a link 106. A link 106 may take the form of a direct connection (e.g., a single wire or other point-to-point connection), a networked connection, or any combination thereof. Thus, in some embodiments, one or more links 106 traverse a network 110, which may include any number of wired and/or wireless networks such as a Local Area Network (LAN), an Ethernet subnet, a PCI or PCIe subnet, a switched PCIe subnet, a Wide Area Network (WAN), a Metropolitan Area Network (MAN), the Internet, or the like. In some embodiments, a host 102 has multiple links 106 with a single storage controller 108 for redundancy. In some embodiments, multiple links 106 operate in parallel to increase bandwidth.

To interact with (e.g., read, write, modify, etc.) remote data, a host 102 sends one or more data transactions to the respective storage system 104 via a link 110. Data transactions are requests to read, write, or otherwise access data stored within a data storage device such as the storage system 104, and may contain fields that encode a command, data (i.e., information read or written by an application), metadata (i.e., information used by a storage system to store, retrieve, or otherwise manipulate the data such as a physical address, a logical address, a current location, data attributes, etc.), and/or any other relevant information.

Turning now to the storage system 104, the exemplary storage system 104 contains the storage controller 108 and any number of storage devices 112. Storage system is structured to respond to the data transactions from the hosts 102. In some examples, the storage system 104 is structured to make the storage devices 112 appear to be directly connected (local) to the hosts 102. The storage system 104 may group the storage devices 112 for speed and/or redundancy using a virtualization technique such as RAID (Redundant Array of Independent/Inexpensive Disks).

At a high level, virtualization includes mapping physical addresses of the storage devices into a virtual address space and presenting the virtual address space to the host 102. In this way, the storage system 104 represents the group of storage devices 112 as a single device, often referred to as a volume. One or more volumes may also be included in a volume group. Thus, a host 102 can access the volume or volume group without concern for how it is distributed among the underlying storage devices 112. In some examples, the storage devices 112 are structured to include block-level striping, such that data is split across two or more storage devices. In some examples, storage devices 112 include one or more storage devices that store parity information corresponding to the storage stripes. In various examples, the underlying storage devices 112 include one or more hard disk drives (HDDs), and may also include solid state drives (SSDs), optical drives, and/or any other suitable volatile or non-volatile data storage medium.

In some examples, the storage controller 108 is structured to assign storage devices 112 to volumes and volume groups based on user input. The storage controller 108 may also remove storage devices 112 from their volume and/or volume group assignments. For example, the storage controller 108 may delete a volume and/or volume group and may reassign the storage devices 112 associated with the volume to other volumes or may designate them as standby hot spare storage devices.

The storage controller 108 is structured to assign storage devices to operate as standby hot spare storage devices, which may be used in the event that another storage device fails. Accordingly, in the event of such a failure, the storage controller 108 may substitute a standby hot spare storage device for the failed device by assigning the standby hot spare storage device to operate as an in-use hot spare storage device. Once the failed storage device is replaced, the storage controller 108 may also assign in-use hot spare storage devices to operate as standby hot spare storage devices. For example, if a failed storage device is replaced, the in-use hot spare device that was substituted for the failed storage device may be assigned back to its role as a standby hot spare storage device.

In some examples, the storage controller 108 is structured to implement the above techniques for managing the storage devices 112 in machine-executable instructions that are executed from a firmware device. In some examples, the storage controller 108 may include a combination of hardware and software to implement the above storage device management techniques.

In the present example, the storage controller 108 is structured to detect events corresponding to storage devices 112. For example, the storage controller 108 may detect triggers for events such as assigning storage devices to volumes and volume groups, removing storage devices from volumes and/or volume groups, assigning storage devices to operate as standby hot spare devices, and assigning storage devices to operate as in-use hot spare devices. As described below, triggers may be used to determine the spin speed for the corresponding storage devices. The storage controller 108 may also be structured with one or more timers, which are configured to monitor the lengths of time periods between assignments corresponding to each HDD. In addition, the storage controller 108 is structured to monitor and measure a number of I/O operations corresponding to each of the storage devices 112. For example, storage controller 108 may identify when a number of I/O operations corresponding to a particular storage device exceeds or is below a threshold for a particular time period.

The storage controller 108 is structured to communicate with storage devices 112, such as by performing I/O operations using the storage devices. In the present example, the storage controller 108 communicates with the storage devices 112 via a backplane 114. One or more connectors may couple the storage devices 112 to the backplane 114, such as one or more SCSI connector cables. The storage controller 108 is structured to perform I/O operations corresponding to HDDs of the storage devices 112 when the HDDs are operating at full spin speeds as well as when the HDDs are operating at reduced spin speeds.

In some examples, a full spin speed of an HDD is the HDD's top speed. In the present example, the reduced spin speed is less than the full spin speed. The reduced spin speed corresponds to a speed that is between the full spin speed and a spun down (non-spinning) spin speed. For example, a reduced spin speed may be $1/10^{th}$ the full spin speed. As merely one example of a relation between a full spin speed and a reduced spin speed, if the full spin speed is 15,000 RPMs, the reduced spin speed may be 1,500 RPMs. In other examples, the full spin speed and the reduced spin speed may include other spin speeds. Further, a plurality of reduced spin speeds may be used depending on the particular assignment of the HDD, number of I/O operations corresponding to the HDD, and/or role of the HDD.

The rate of I/O operations that may be performed by an HDD is increased when the HDD is operating at a full spin speed. A faster spin speed may allow the HDD to have a faster seek rate, and therefore increase the speed of accessing data for I/O operations. In contrast, the number of I/O operations that may be performed may be decreased when an HDD is operating at reduced spin speed. Thus, when operating at the reduced spin speed, HDDs may offer the benefits of reduced power consumption, reduced heat, reduced noise, and longer life, but at the cost of providing slower I/O while operating at the reduced spin speed.

The storage controller 108 is structured to identify triggers for operating the HDDs of the storage devices 112 at full speed and at reduced speeds. For example, the storage controller 108 is structured to operate the HDDs at full speed unless the HDDs are not assigned to volumes and/or volume groups, are operating as standby hot spare devices, and/or have I/O operations that are below a threshold. In other examples, other triggers may be used.

The storage controller 108 is structured to control spin speeds of the HDDs responsive to the triggers, such that the HDDs may each be transitioned between the full spin speed and the reduced spin speed. In some examples, the storage controller 108 varies a spin speed of an HDD by controlling a power input of the HDD. In other examples, the storage controller 108 varies a spin speed of an HDD by transmitting a command to the HDD, such as by communicating a SCSI command to the HDD via the backplane 114. In yet other examples, the storage controller 108 varies the spin speed of an HDD by using other techniques. For example, the power input of the HDD may be controlled by reducing the power input to reduce the spin speed and increasing the power input to increase the spin speed.

For example, the storage system 104 may be structured with a power regulator to control a power input to the HDD. The regulator may be included, for example, in each HDD, as part of the storage controller 108, or in another component of the storage system 104. In some examples, the storage controller 108 controls the HDD by transmitting a command to the HDD, causing the HDD to regulate its power input, thereby triggering the HDD to provide a particular spinning speed corresponding to the power input. In another example, the storage controller 108 may communicate commands to a regulator that is external to the HDD that causes the regulator to provide particular power inputs to the HDD. As an example, 12V may be supplied to the HDD to trigger the HDD to operate at the full spin speed, while 5V may be supplied to the HDD to trigger the HDD to operate at the reduced spin speed. In other examples, the power supplied may include other voltage and/or current inputs.

HDDs of the storage devices 112 are structured to receive the power and/or command inputs from the storage controller 108. For example, an HDD may receive a SCSI command from the storage controller 108 via backplane 114. In another example, the HDD may receive the power input via a power cable that is coupled to the HDD. Responsive to the input, the HDDs are structured to respond by increasing the spin speed to the full spinning speed or reducing the spin speed to the reduced spinning speed. For example, HDDs may receive SCSI commands from the storage controller 108 that causes the HDDs to reduce their power input. Each HDD may be structured with firmware that includes machine executable instructions that are executed to increase and reduce the spin speed. For example, the HDD may include software, hardware, or a combination thereof to receive inputs from the storage controller 108.

In the present example, each of the HDDs of the storage devices 112 are structured with a spindle motor that is coupled to a spindle. The spindle is coupled to platters, which store data. The spindle motor rotates the spindle, which spins the platters. In the present example, the spin speed or spinning speed of an HDD refers to a speed at which a platter or platters are rotated by the spindle. In some examples, as described above, the spin speed is controlled by regulating HDD power inputs and/or transmitting commands to the HDDs from the storage controller 108. Accordingly, in some examples, by increasing or decreasing the power supplied to the spindle motor, each HDD is structured to spin the platters at full speed or at reduced speed.

In some examples, each HDD of the storage devices 112 is structured with software, hardware, or a combination thereof that is configured to measure a number of I/O operations processed by the HDD over a period of time. Accordingly, in some examples, a HDD may detect when I/O operations exceed a threshold or fall below a threshold. The spin speed of the HDD may be adjusted accordingly by the HDD, without being triggered to vary the spin speed by the storage controller 108. In other examples, an HDD may communicate with the storage controller 108, such as via the backplane 114, to notify the storage controller 108 when I/O exceeds or falls below an I/O threshold.

Figure 2:
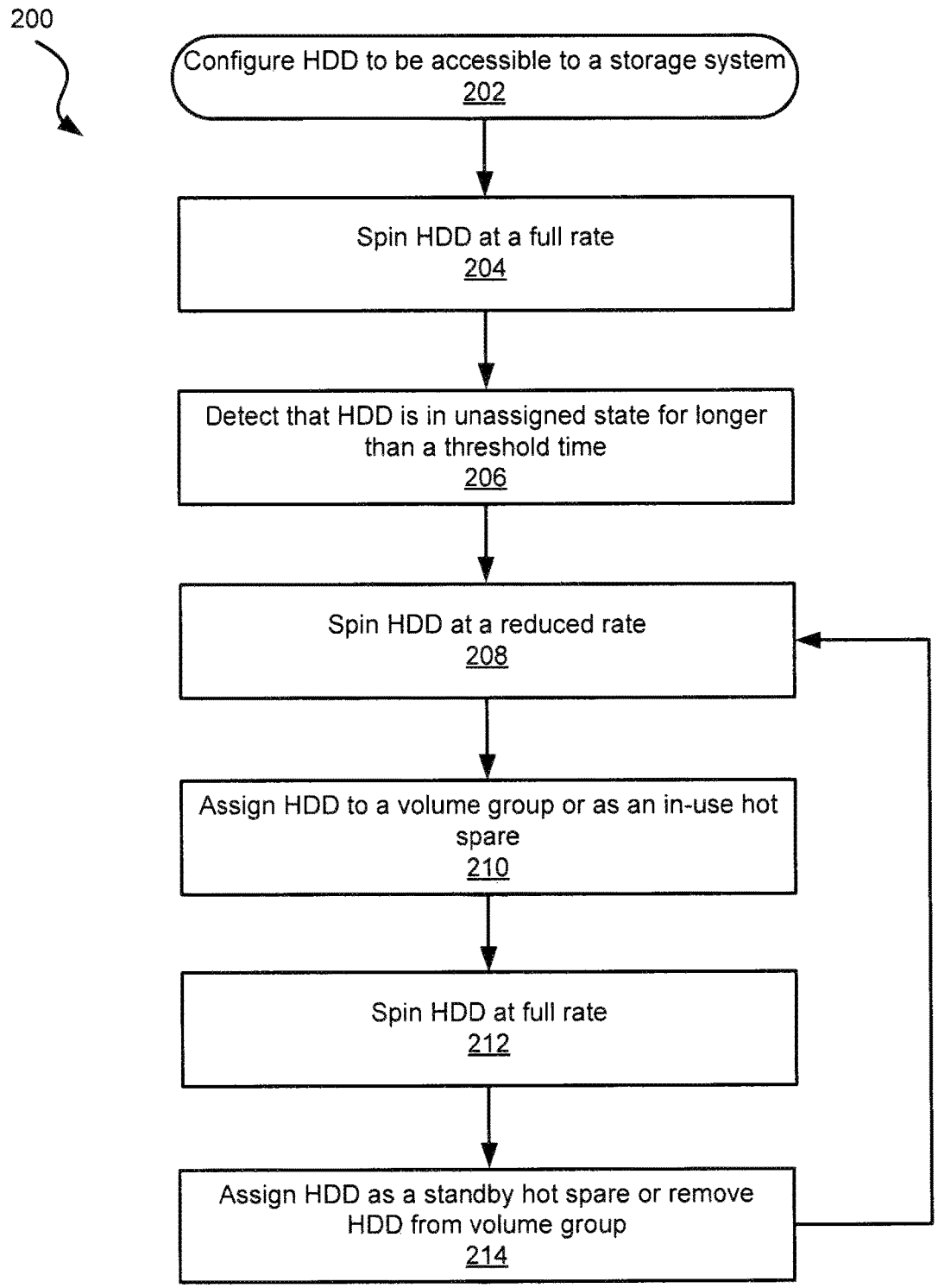
FIG. 2 is a flow diagram of a method for varying HDD spin speeds according to aspects of the present disclosure.

FIG. 2 is a flow diagram illustrating a method for varying HDD spin speeds according to some examples of the present disclosure. The method 200 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 200, and some of the steps described can be replaced, eliminated and/or re-ordered for other embodiments of the method 200.

At action 202, an HDD is configured to be accessible in a storage system. In some examples, the HDD is inserted into a storage system. For example, the HDD may be connected by a 5V and/or 12V power connector to a power supply. The HDD may also be coupled to a storage controller, such as by a backplane and one or more cable connectors. Accordingly, the HDD may be physically coupled to the storage controller, such that the HDD is made accessible for processing I/O operations that are received from the storage controller. For example, the making accessible of the HDD may include spinning the HDD up to a particular spin speed and the storage controller communicating with the HDD. In some examples, the HDD and/or storage system containing the HDD is configured via software, such as by a user interface, such that the HDD is made accessible in the storage system, for example by making the HDD accessible for the storage controller to send communications to the HDD and receive communications from the HDD.

At action 204, the HDD is spun at a full spin speed. In some examples, the HDD is spun at a full speed by providing a particular power input and/or by transmitting a command from the storage controller to the HDD. In some examples, the HDD may default to the full spin speed upon being inserted into the storage system. However, in other examples, however, the HDD may default to a reduced spin speed. In yet other examples, the HDD may be configured by a user to start operation at full spin speed or reduced spin speed based on the particular configuration performed by a user.

At action 206, the storage controller and/or HDD detects that the HDD has remained in an unassigned state for longer than a threshold amount of time. In some examples, the unassigned state may refer to the HDD not being assigned to a volume, volume group, or as an in-use hot spare. In some examples, the threshold amount of time is a predetermined amount of time. In other examples, the threshold amount of time is user configurable, such as by an interface provided by the storage controller. In some examples, the storage controller and/or HDD may include one or more timers to track the amount of time the HDD remains in an unassigned state.

At action 208, after detecting that the threshold amount of time is exceeded, the HDD is controlled by the storage controller to operate at a reduced spin speed state. Accordingly, the spin speed of the HDD is reduced to the reduced spin speed. In some examples, the storage controller transmits a command to the HDD and/or reduces a power input to the HDD to cause the HDD to spin at the reduced speed. For example, the storage controller may issue a SCSI command to the HDD to operate at the reduced speed. However, in other examples, the HDD itself may recognize that the HDD has not been assigned, such as by detecting that no I/O has been received. Accordingly, the HDD may be configured to reduce the spin speed of its own volition.

While the HDD is in the unassigned state, the storage controller may assign the HDD to operate as a standby hot spare storage device. The HDD operating as a standby hot spare storage device allows the storage controller to substitute the HDD for another storage device in the event of a failure of the storage device. In some examples, while the HDD is assigned as a standby hot spare storage device, the HDD is structured to maintain the reduced speed.

At action 210, the storage controller assigns the HDD to a volume, volume group, and/or as an in-use hot spare. In some examples, the assignment of the HDD to a volume and volume group is performed responsive to user input. For example, a user may configure the volume group by selecting storage devices to include in the volume group. In some examples, the HDD is assigned by the storage controller to operate as an in-use spare based on the storage controller detecting a storage device failure. For example, upon a storage device failure, the storage controller may select an HDD that is assigned as a standby hot spare to substitute for the failed storage device.

At action 212, based on the assignment of the HDD, the HDD's spinning speed is increased to the full spin speed. In some examples, the storage controller provides a power input and/or transmits a command from the storage controller to the HDD to control the HDD spin rate. Accordingly, in the present example, the HDD is spun at a full spin speed based on the storage controller's assignment of the HDD to a volume, volume group, and/or assignment as an in-use hot spare.

At action 214, once the HDD is assigned to a volume, volume group, and/or as an in-use hot spare, the storage controller may assign the HDD as a standby hot spare or remove the HDD from the volume or volume group. The assignment of the HDD to operate as a standby hot spare, rather than as an in-use hot spare may be a trigger for reducing the spinning rate of the HDD. Similarly, the removing of the HDD from the volume and/or volume group may be a trigger for reducing the spinning rate of the HDD. In some examples, the HDD is removed from the volume and/or the volume group by deleting the volume and/or volume group.

In the present example, the removal of the HDD from the volume, volume group, or assignment of the HDD to operate as an in-use hot spare triggers a reduction of the spinning rate of the HDD. Therefore, in the present example, the method may continue at action 208 to decrease the spin rate of the HDD to the reduced spinning rate, which may be maintained until the HDD is assigned once again at action 210.

Figure 3:
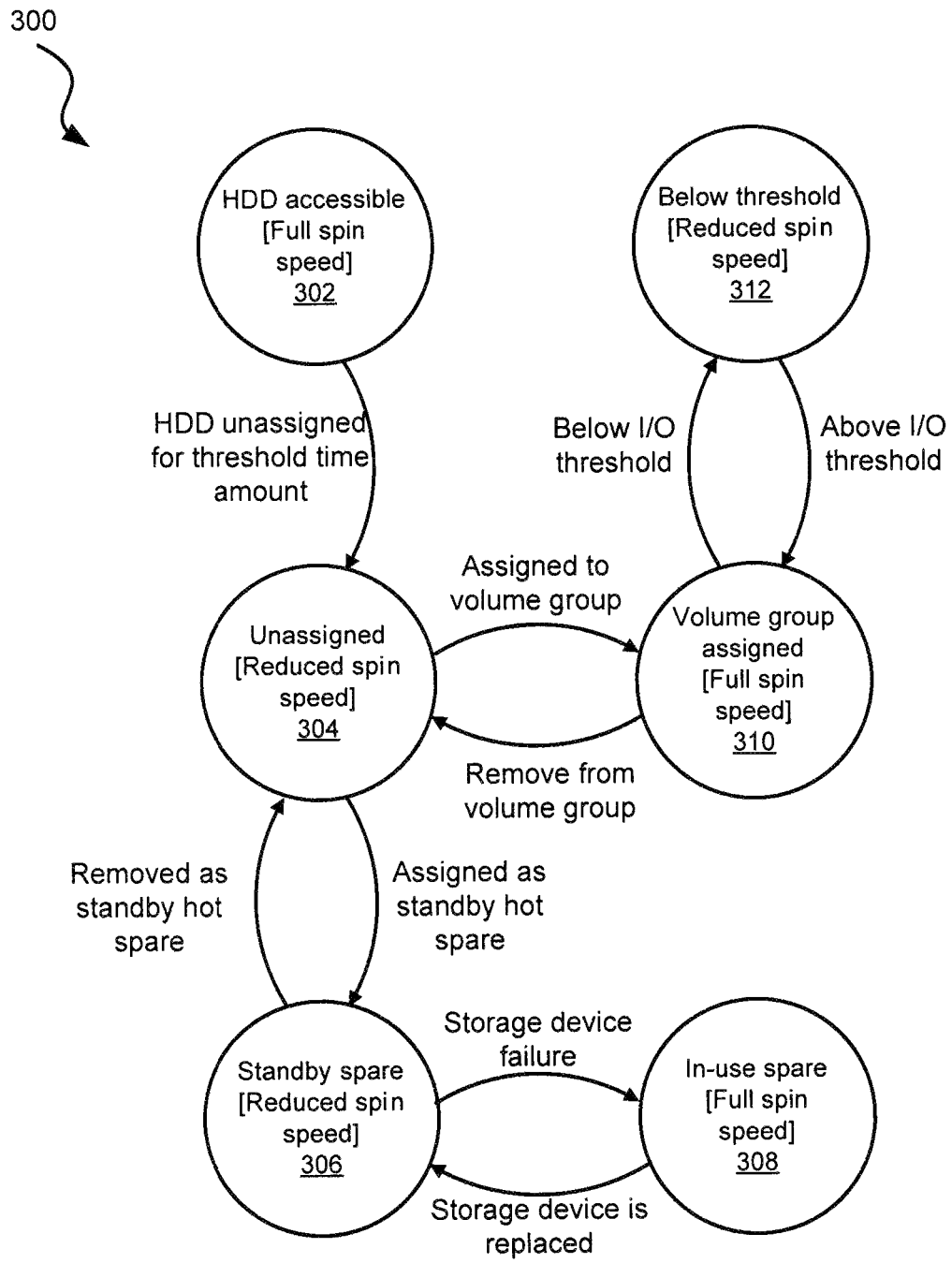
FIG. 3 is a state diagram illustrating state changes corresponding to an exemplary method of varying HDD spin speeds according to aspects of the present disclosure.

FIG. 3 is a state diagram that illustrates state changes 300 corresponding to an exemplary method of varying HDD spin speeds.

At state 302, an HDD is placed in a state 302 where the HDD is accessible for I/O operations by a storage controller. For example, the HDD may be inserted into a storage system by connecting power to the HDD and physically coupling the HDD to a storage controller. While in state 302, the HDD is spun at a full spin speed. In some examples, the HDD is spun at a full spin speed by providing a full power input to the HDD and/or by transmitting a command from the storage controller to the HDD. Responsive to the command and/or power input, the HDD may control its spindle motor to increase the spin speed of its platter(s) to the full spin speed. However, in other examples, however, the HDD may default to a reduced spin speed and thus in state 302 may have a reduced spin speed.

In the present example, the HDD may transition from state 302 to state 304 when the storage controller, HDD, or other entity detects that the HDD has been in the accessible but unassigned state 302 for longer than a threshold amount of time. In some examples, the threshold amount of time is a predetermined amount of time. In some examples, the threshold may be user-configured. In some examples, the storage controller may include one or more timers associated with the HDD to track the amount of time the HDD remains in a particular state.

At state 304, the HDD remains in the unassigned state. While in the unassigned state, the HDD may operate at a reduced spin speed. In some examples, the HDD is spun at the reduced speed by providing a reduced power input to the HDD and/or by transmitting a command from the storage controller to the HDD. Responsive to the command and/or power input, the HDD may control its spindle motor to reduce the spin speed of its platter(s) to the reduced spin speed.

In the present example, the HDD may transition from state 304 to state 306 when the storage controller assigns the HDD to operate as a standby hot spare storage device. In some examples, the storage controller may perform the assignment responsive to user input received by a user input.

In other examples, the HDD may be selected automatically based on the storage controller identifying that the HDD is unassigned.

At state 306, the HDD is operating as a standby spare storage device, such that the HDD is ready to be substituted for another storage device in the event of a storage device failure. While assigned to operate as a standby spare storage device, the HDD may maintain the reduced spin speed that was set in state 304.

In the present example, the HDD may transition from state 306 to state 308 when the storage controller assigns the HDD as an in-use hot spare storage device. In the present example, the assignment is triggered by the storage controller when the storage controller identifies that a storage device has failed. In some examples, the storage device is an HDD. In other examples, the storage device may be a non-HDD device, such as an SSD. For example, upon detecting a storage device failure, the storage controller may select an HDD that is in state 306 to substitute for the failed storage device.

At state 308, the HDD is assigned by the storage controller to operate as an in-use hot spare storage device. In state 308, the HDD spin speed is accelerated to the full spin speed. The full spin speed may be maintained while the HDD is operating as an in-use hot spare storage device.

In the present example, the HDD may transition from state 308 back to state 306. For example, the storage controller may assign the HDD from operating as an in-use hot spare storage device to operating as a standby hot spare storage device. For example, the storage controller may assign the HDD to operate as a standby hot spare storage device based on identifying that the failed storage device for which the HDD was substituting is replaced.

The HDD may further transition from the state 306 to the state 304. For example, the storage controller may remove the HDD from its assigned standby hot spare storage device assignment, such that the HDD is placed in unassigned state 304.

In the present example, the HDD may transition from state 304 to state 310 when the storage controller assigns the HDD to a volume and/or volume group. In some examples, the assignment of the HDD to a volume and/or volume group is performed responsive to user input. For example, a user may configure the volume group by selecting storage devices to include in the volume group. In another example, the assignment of the HDD to the volume and/or volume group by the storage controller may be configured to automatically be performed based on the storage controller identifying that the HDD is unassigned.

In state 310, the HDD is assigned to a volume and/or volume group. Accordingly, the HDD spin speed is increased to the full spin speed. In some examples, the HDD is spun at a full spin speed by the storage controller providing a power input and/or by transmitting a command from the storage controller to the HDD.

In the present example, the HDD may transition from the state 310 to the state 304 by the storage controller removing the HDD from a volume and/or volume group. For example, the storage controller may delete a volume and/or volume group. Accordingly, the HDD may transition from state 310 back to the unassigned state 304.

In the present example, the HDD may also transition to state 312. For example, when the storage controller and/or HDD detects that a number and/or rate of I/O operations corresponding to the HDD has decreased below a threshold, the HDD may be transitioned by the storage controller to state 312. The number of I/O operations corresponding to the HDD may be measured based on a number of I/O requests per unit of time, which may be compared to the threshold. In some examples, the threshold is a user-configured threshold. In other examples, the threshold may be determined by the storage controller based on monitoring storage system performance.

In state 312, the HDD has been detected to have an I/O below the threshold. While the HDD is in state 312, the spin speed of the HDD is reduced to the reduced spin speed. While the HDD is in state 312, I/O requests are monitored to detect if the I/O increases above the threshold.

In the present example, the HDD may transition back to state 310 when the number of I/O operations increases above the threshold. In some examples, the monitoring of the number of I/O operations and comparing of the number of I/O operations to the threshold is performed by the storage controller, the HDD, or a combination of the storage controller and the HDD.

Figure 4:
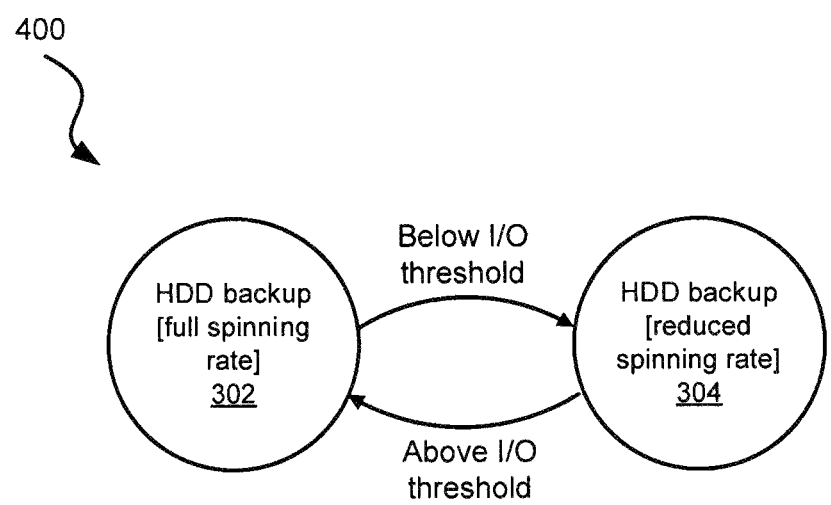
FIG. 4 is a state diagram illustrating exemplary state changes corresponding to an HDD involved in archiving operations according to aspects of the present disclosure.

FIG. 4 is a state diagram illustrating state changes corresponding to an HDD involved in archiving operations according to some examples of the present disclosure. The method 400 may be performed by processing logic that may comprise hardware (e.g., circuitry, dedicated logic, programmable logic and microcode), software (such as instructions run on a computer system, specialized hardware, dedicated machine, or processing device), firmware, or a combination thereof. Additional steps can be provided before, during, and after the steps of method 400, and some of the steps described can be replaced, eliminated and/or re-ordered for other embodiments of the method 400.

In the present example, the storage controller transitions the HDD spin rate between a full spinning rate and a reduced spinning rate based on detecting I/O changes corresponding to the HDD. In the present example, the HDD is performing data archiving/backup.

In state 302, the HDD operates at a full spinning rate to perform the archiving. If the storage controller and/or the HDD detects that a number of I/O operations falls below a threshold, the HDD may transition to state 304.

In state 304, the HDD operates at a reduced spinning rate. While in this state, the HDD may still perform some archiving operations that have I/O that is below the I/O threshold. If the storage controller and/or the HDD detects that a number of I/O operations increases above a threshold, the HDD may transition to state 302.

The present embodiments can take the form of an entirely hardware embodiment, an entirely software embodiment, or an embodiment containing both hardware and software elements. In that regard, in some embodiments, the computing system is programmable and is programmed to execute processes including those associated with the processes of method 200 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium can be an electronic, magnetic, optical, electromagnetic, infrared, or a semiconductor system (or apparatus or device). In some embodiments, the storage controller 108 and/or one or more processors running in one or more of the storage system 104 or the hosts 102 execute code to implement the actions described above.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for varying spin rates in a storage system, the method comprising:
    controlling a spin speed of a hard disk drive (HDD) coupled to a storage controller to be a first spinning speed;
    detecting that the HDD is unassigned for an amount of time that exceeds a threshold;
    after detecting that the threshold is exceeded, controlling the spin speed of the HDD to be a second spinning speed, wherein the second spinning speed is less than the first spinning speed, and wherein the second spinning speed is greater than zero rotations per minute;
    assigning the HDD; and
    after assigning the HDD, controlling the spin speed of the HDD to be the first spinning speed.

2. The method of claim 1, wherein assigning the HDD includes assigning the HDD to a volume group.

3. The method of claim 2, the method further comprising:
    removing the HDD from the volume group; and
    after removing the HDD from the volume group, controlling the spin speed of the HDD to be the second spinning speed.

4. The method of claim 1, wherein assigning the HDD includes assigning the HDD to operate as an in-use hot spare.

5. The method of claim 4, the method further comprising:
    assigning the HDD from operation as the in-use hot spare to operation as a standby hot spare; and
    after assigning the HDD to operate as the standby hot spare, controlling the spin speed of the HDD to be the second spinning speed.

6. The method of claim 2, the method further comprising:
    while spinning the HDD at the first spinning speed, detecting that a number of I/O operations corresponding to the HDD is below an I/O threshold; and
    based on the detecting that the number of I/O operations is below the I/O threshold, controlling the spin speed of the HDD to be the second spinning speed.

7. The method of claim 1, wherein the storage system is a RAID storage system.

8. The method of claim 1, the method further comprising:
    detecting a failure of another storage device; and
    based on the detected failure, assigning the HDD from operation as a standby hot spare to operation as an in-use hot spare.

9. The method of claim 1, wherein the spin speed of the HDD is controlled by at least one of the following: (1) the storage controller transmitting a SCSI command to the HDD; and (2) the storage controller regulating a power input of the HDD.

10. A non-transitory machine readable medium having stored thereon instructions for performing a method of varying a rotational spin speed corresponding to a storage device, comprising machine executable code which when executed by at least one storage controller, causes the storage controller to:
    control a spin speed of an HDD to be a first spinning speed;
    detect that the HDD is unassigned for an amount of time that exceeds a threshold;
    after detecting that the threshold is exceeded, control the spin speed of the HDD to be a second spinning speed, wherein the second spinning speed is less than the first spinning speed, and wherein the second spinning speed is greater than zero rotations per minute;
    assign the HDD to a volume group or to be an in-use hot spare; and
    after assigning the HDD, control the spin speed of the HDD to be the first spinning speed.

11. The non-transitory machine readable medium of claim 10 comprising further machine executable code that causes the storage controller to:
    delete the volume group; and
    after deleting the volume group, control the spin speed of the HDD to be the second spinning speed.

12. The non-transitory machine readable medium of claim 10 comprising further machine executable code that causes the storage controller to:
    assign the HDD to operate as a standby hot spare; and
    after assigning the HDD to operate as a standby hot spare, control the spin speed of the HDD to be the second spinning speed.

13. The non-transitory machine readable medium of claim 10 comprising further machine executable code that causes the storage controller to:
    while spinning the HDD at the first spinning speed, detect that a workload corresponding to the HDD is below a workload threshold; and
    based on the detecting that the workload is below the workload threshold, decrease the spin speed of the HDD to the second spinning speed.

14. The non-transitory machine readable medium of claim 10, wherein the HDD is included in a RAID storage system.

15. The non-transitory machine readable medium of claim 10, wherein the spin speed of the HDD is controlled by a storage controller regulating a power input of the HDD.

16. The non-transitory machine readable medium of claim 10, wherein the spin speed of the HDD is controlled by the storage controller transmitting a SCSI command to the HDD.

17. A computing device comprising:
    a memory containing machine readable medium comprising machine executable code having stored thereon instructions for performing a method of varying a spin speed corresponding to a hard disk drive (HDD);
    a processor coupled to the memory, the processor configured to execute the machine executable code to:
    rotate a platter of the HDD at a first spinning speed;
    detect that the HDD is unassigned for an amount of time that exceeds a threshold;
    after detecting that the threshold is exceeded, rotate the platter of the HDD at a second spinning speed that is less than the first spinning speed;
    assign the HDD to at least one of the following: (1) a volume group; or (2) an in-use hot spare; and
    after assigning the HDD, rotate the platter of the HDD at the first spinning speed.

18. The computing device of claim 17, wherein the HDD is included in a RAID storage system.

19. The computing device of claim 17, wherein the HDD spinning speed is controlled by a storage controller regulating a power input of the HDD.

20. The computing device of claim 17, wherein the HDD spinning speed is controlled by a SCSI command received from a storage controller.

\* \* \* \* \*